United States Patent
Hutchinson

[11] Patent Number: 6,005,529
[45] Date of Patent: Dec. 21, 1999

[54] ANTENNA ASSEMBLY WITH RELOCATABLE ANTENNA FOR MOBILE TRANSCEIVER

[75] Inventor: Benjamin H. Hutchinson, Rockville, Md.

[73] Assignee: ICO Services Ltd., London, United Kingdom

[21] Appl. No.: 08/982,397

[22] Filed: Dec. 2, 1997

[30] Foreign Application Priority Data

Dec. 4, 1996 [EP] European Pat. Off. .............. 96308789

[51] Int. Cl.$^6$ ................................................. H01Q 21/26
[52] U.S. Cl. .......................... 343/797; 343/702; 343/795
[58] Field of Search ................................. 343/797, 702, 343/700 MS, 906, 795; H01Q 21/26, 1/24

[56] References Cited

U.S. PATENT DOCUMENTS

| | | | |
|---|---|---|---|
| 5,075,691 | 12/1991 | Garay et al. | 343/700 MS |
| 5,280,286 | 1/1994 | Williamson | 342/44 |
| 5,357,262 | 10/1994 | Blaese | 343/702 |
| 5,671,267 | 9/1997 | August et al. | 379/61 |
| 5,748,085 | 5/1998 | Davis et al. | 340/572 |

FOREIGN PATENT DOCUMENTS

| | | |
|---|---|---|
| 43 30 436 | 9/1993 | Germany . |
| 1164647 | 6/1989 | Japan . |
| 930024041 | 2/1993 | Japan . |
| 5169020 | 7/1993 | Japan . |
| 539979 | 10/1941 | United Kingdom . |

*Primary Examiner*—Hoanganh Le
*Attorney, Agent, or Firm*—McDermott, Will & Emery

[57] ABSTRACT

An antenna assembly comprises a panel (1) with suckers (3) for mounting it to a window or other vertical surface. A foil antenna (2) is formed on the panel (3). The antenna (2) may be coupled to a transceiver (8) by a feeder (6) so that in use it replaces the transceiver's own antenna. In another arrangement, the antenna may simply re-radiate radio signals transmitted by the transceiver using its own antenna.

7 Claims, 3 Drawing Sheets

ANTENNA ASSEMBLY WITH RELOCATABLE ANTENNA FOR MOBILE TRANSCEIVER

FIELD OF THE INVENTION

The present invention relates to a transmitting system including a mobile transceiver and a relocatable antenna.

BACKGROUND TO THE INVENTION

When a handheld mobile telephone is used within a building, the structure of the building can result in the telephone losing contact with a base station. This problem is particularly acute in the case of a mobile telephone that communicates with a base station via a satellite.

SUMMARY OF THE INVENTION

It is an object of the present invention to overcome the aforementioned problem.

According to the present invention, there is provided a transmitting system comprising a portable transceiver having output rf power amplifier and an integral antenna, an antenna assembly including an relocatable antenna and a mounting means for harmlessly and releasably mounting said relocatable antenna to a vertical surface, and coupling means arranged to enable the transceiver to communicate via said assembly instead of or in addition to said integral antenna. Typically, the mounting means would be used to mount the antenna to a window or wall. It is important that the mounting means does not damage or permanently mark the surface to which it is attached. Suckers are suitable for this purpose.

The relocatable antenna may comprise a ground plane antenna, a dipole antenna, an array or some other form of antenna. However, an antenna producing circularly polarized radiation, such as crossed dipoles, is preferred. Preferably, the antenna is arranged to radiate significantly in directions between 20° and 70° above the horizon.

Preferably, the mounting means comprises a panel and the antenna comprises an arrangement of conductive, and more particularly metallic, foil on the panel.

Preferably, the coupling means comprises a transmission line for coupling the output rf power amplifier to the relocatable antenna. Alternatively, the coupling means comprises a first connector part on said assembly and a second connector part removably attached to the main part of transmitter and configured to co-operate with the first connector part, the second connector part including the output rf power amplifier of the transceiver. Communication signals may transmitted from the main part of the transmitter to the second connector part by a cable or by an infrared link.

DESCRIPTION OF PREFERRED EMBODIMENTS

Preferred embodiments of the present invention will now be described, by way of example, with reference to the accompanying drawings.

Figure 1:
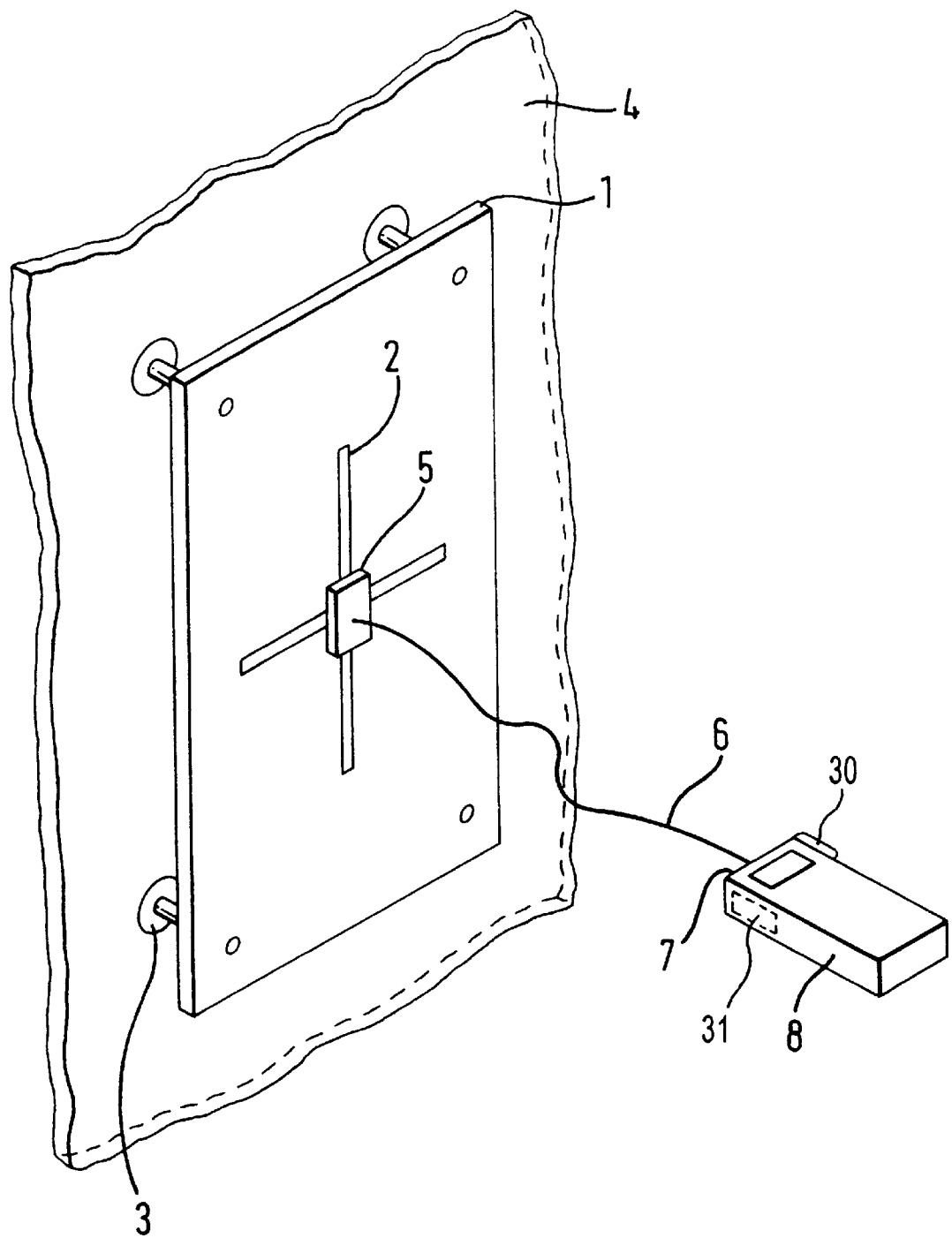
FIG. 1 shows a first embodiment of the present invention.

Referring to FIG. 1, an antenna assembly comprises a rectangular, dielectric panel 1, a foil crossed-dipoles antenna 2, formed on the panel, and four suckers 3. The dielectric panel 1 is dimensioned so that it may be conveniently carrier in a briefcase, for instance it may be the same size as a sheet of ISO A4 paper. A sucker 3 is located at each corner of the panel 1. The suckers 3 serve to mount the panel 1 to a vertical surface, for instance a window pane 4, and are shaped to give a clearance of 2 to 4 cm between the panel 1 and the window pane 4.

An automatic matching unit 5 is connected between the feed point of the antenna 2 and a coaxial flying lead 6. The proximity of the window pane 4 will alter the antenna's input impedance, the actual change depending on various factors including whether the window is wet. The automatic matching unit 5 ensures that the proximal end of the flying lead 6 is terminated with the appropriate resistive load, typically 50Ω or 75Ω. Automatic matching units are well known in the field of radio communication.

The distal end 7 of the flying lead is provided with a plug (not shown) for connecting the flying lead 6 to a transceiver 8 such as a mobile telephone. The transceiver 8 includes an integral antenna 30 and an output rf power amplifier 31.

In use signals to be transmitted by the transceiver 8 are applied to the antenna 2 via the flying lead 6. Similarly, signals detected by the antenna 2 are applied to the transceiver's receiver via the flying lead 6.

In another arrangement, the antenna may simply re-radiate radio signals transmitted by the transceiver using its own antenna.

Figure 2:
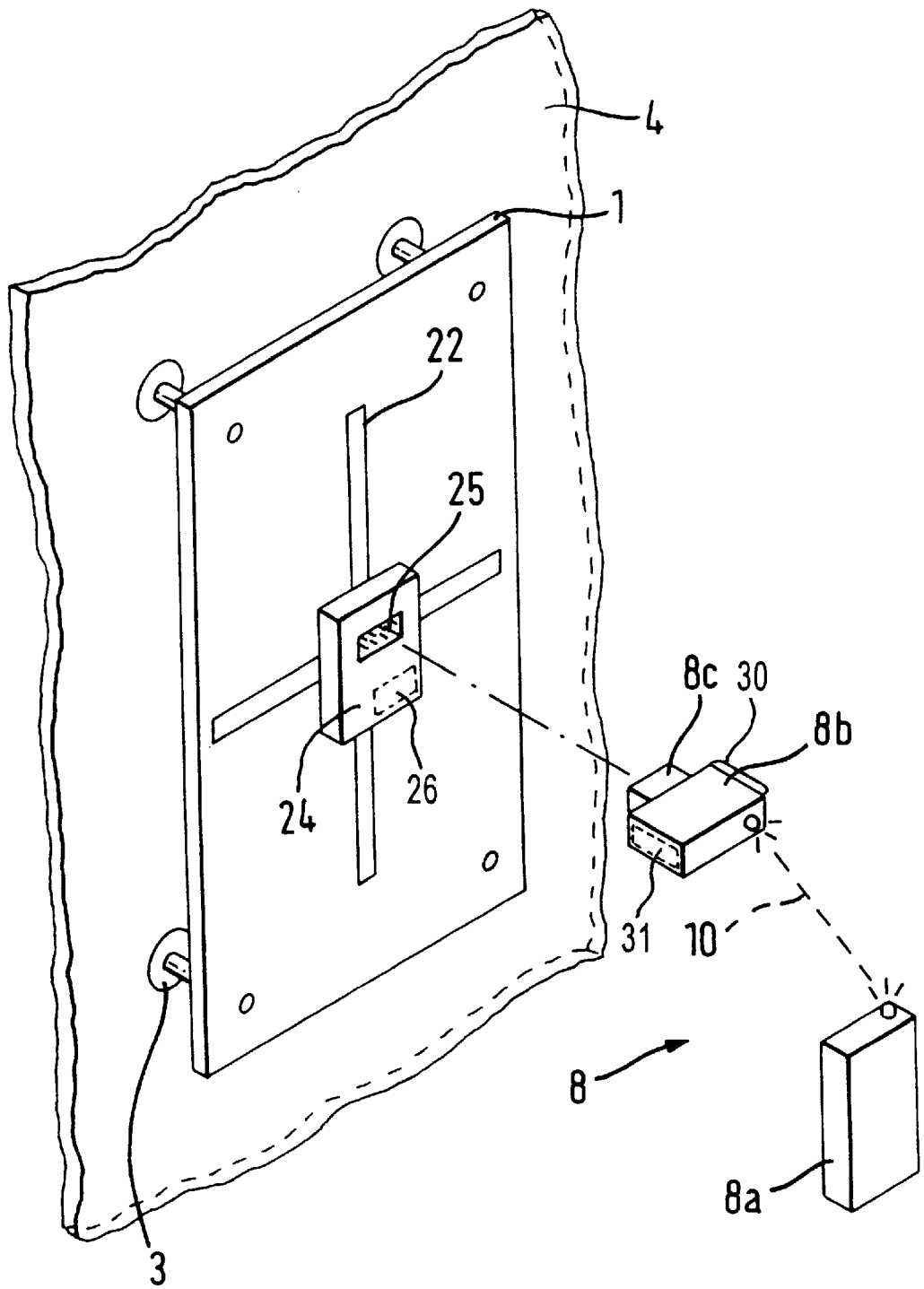
FIG. 2 shows a second embodiment of the present invention.

Referring to FIG. 2, in a second embodiment, a crossed-dipoles antenna 22 is again used. A housing 24, having a socket 25 and enclosing a battery 26, is located at the feedpoint of the antenna 22. Contacts of the socket 25 are connected to respective elements of the antenna 22. The transceiver 8 comprises first and second separable parts 8a, 8b. The first part 8a houses the baseband and control circuitry and the second part 8b houses the rf circuitry including an output rf power amplifier 31. The second part 8b is also provided with a plug 8c, configured to co-operate with the socket 25.

Normally, the transceiver 8 is used with its parts 8a, 8b united. In this state, control and modulation signals are sent from the first part 8a to the second part 8b via electrical connectors. Similarly, demodulated signals are transferred from the second part 8b to the first part 8a via the electrical connectors.

When the user wishes to make use of the antenna assembly, he separates the parts 8a, 8b of the transceiver 8 and plugs the second part 8b into the socket 25. An infrared link 10 for speech and control signals is provided between the parts 8a, 8b of the transceiver 8 once the second part 8b has been plugged into the socket 25. In this condition the second part 8b is isolated from the power supply in the first part 8a and is powered from the battery in the housing 24.

Figure 3:
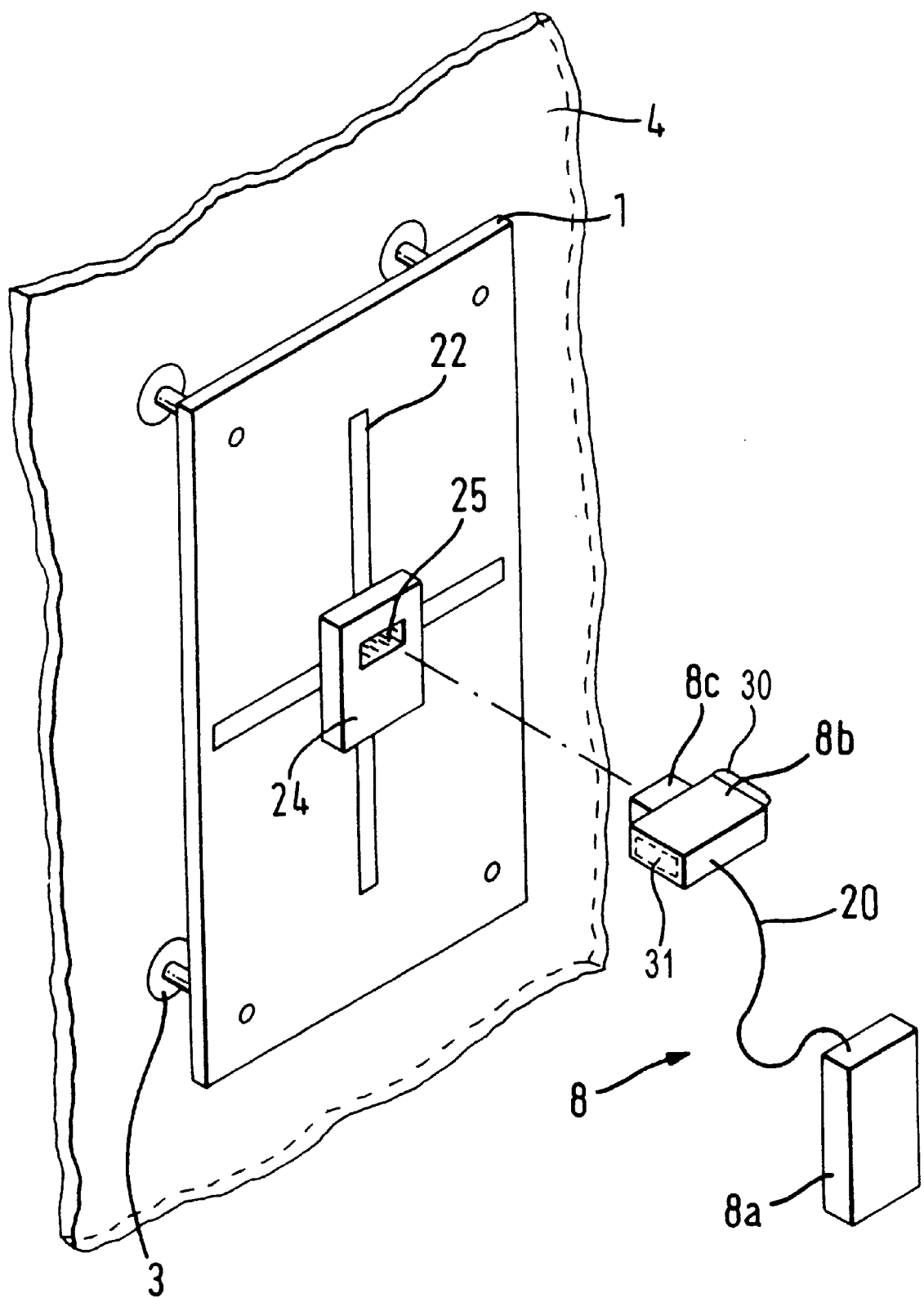
FIG. 3 shows a third embodiment of the present invention.

Referring to FIG. 3, in a third embodiment, the infrared link of the second embodiment is replaced by a multicore cable 20 which is normally stored within the first part 8a of the transceiver 8. The multicore cable 20 carries not only speech and control signals but also power for the rf circuitry in the second part 8b of the transceiver 8.

What is claimed is:

1. A transmitting system comprising:
   a portable transceiver having output rf power amplifier and an integral antenna,
   an antenna assembly, and
   coupling means arranged to enable the transceiver to communicate via said assembly which thereby at least partially substitutes for said integral antenna, wherein the antenna assembly comprises a panel, a metallic foil antenna on the panel and a sucker for harmlessly and releasably fixing the panel to a vertical surface.

2. A system according to claim 1, wherein the metallic foil antenna comprises an antenna producing circularly polarized radiation.

3. A system according to claim 2, wherein the metallic foil antenna comprises a crossed-dipole antenna.

4. A system according to claim 1, wherein the coupling means comprises a transmission line for coupling the output rf-power amplifier to the metallic foil antenna.

5. A system according to claim 1, wherein the coupling means comprises a first connector part on said assembly and a second connector part removably attached to the main part of transceiver and configured to co-operate with the first connector part, the second connector part including an output rf power amplifier of the transceiver.

6. A system according to claim 5, wherein communication signals are transmitted from the main part of the transceiver to the second connector part via a cable.

7. A system according to claim 5, wherein communication signals are transmitted from the main part of the transceiver to the second connector part by an infrared link.

* * * * *